United States Patent [19]
Carlin et al.

[11] Patent Number: 5,552,238
[45] Date of Patent: Sep. 3, 1996

[54] STABILIZED RECHARGEABLE CELL IN MSE AND METHOD THEREFOR

[75] Inventors: Richard T. Carlin, Colorado Springs, Colo.; Joan Fuller, Raleigh, N.C.

[73] Assignee: The United States of America as represented by the Secretary of the Air Force, Washington, D.C.

[21] Appl. No.: 494,425

[22] Filed: Jun. 26, 1995

[51] Int. Cl.$^6$ ............................................. H01M 10/38
[52] U.S. Cl. .......................... 429/50; 429/103; 205/59; 29/623.5
[58] Field of Search ......................... 429/50, 103, 112, 429/199; 29/623.5; 205/59

[56] References Cited

U.S. PATENT DOCUMENTS

| | | | |
|---|---|---|---|
| 4,076,905 | 2/1978 | Sammells | 429/112 |
| 4,362,794 | 12/1982 | Abraham | 429/101 X |
| 5,096,789 | 3/1992 | Melton et al. | 429/112 |
| 5,135,825 | 8/1992 | Mori et al. | 429/199 X |
| 5,176,649 | 12/1992 | Vaughn | 429/112 |

Primary Examiner—Anthony Skapars
Attorney, Agent, or Firm—Thomas C. Stover; Stanton E. Collier

[57] ABSTRACT

Method is provided for preparing a stabilized rechargeable cell having a negative electrode and a molten salt electrolyte (MSE) while avoiding problems of chloroaluminate cell system which are not air stable. The cell of the present invention thus employs an $LiBF_4/EMI_{BF_4}$ MSE and a negative electrode of an inert substrate. On charging such cell, Li metal plates out on the electrode, which metal would immediately be attacked by such MSE. However a small amount of water is added to the MSE which, forms a lithium salt on the surface of such metal and protects it from attack by the MSE. However such protective film is permeable to $Li^+$ ions. This means that on continuing to charge such cell, the $Li^+$ ions flow from the MSE through the protective film and build up as more Li metal on the negative electrode, under the protective film. On discharge of such cell, the Li metal becomes $Li^+$ ions which can pass through the protective lithium salt film. Accordingly employing a suitable cathode, the rechargeable cell of the invention can operate at high voltage, with a cycling efficiency of over 60%. Also the electrolyte of such cell has a variable temperature range, a high inherent conductivity and is air stable.

6 Claims, 2 Drawing Sheets

STABILIZED RECHARGEABLE CELL IN MSE AND METHOD THEREFOR

STATEMENT OF GOVERNMENT INTEREST

The invention described herein may be manufactured and used by or for the Government for governmental purposes without the payment of any royalty thereon.

BACKGROUND OF THE INVENTION

1. Field Of The Invention

This invention relates generally to a method for making a stabilized rechargeable cell employing a lithium metal negative electrode in a molten salt electrolyte (MSE), particularly with an MSE of relatively low temperature.

2. The Prior Art

It is known to stabilize lithium electrodes in a secondary cell that employs a chloroaluminate-molten salt electrolyte system.

That is, lithium deposition and stripping is known employing EMIC/AlCl$_2$/LiCl (EMIC =1-ethyl-3-methylimidazolium chloride) room-temperature molten salt following addition of a proton source such as EMIHCl$_2$ or triethanolamine-hydrogen chloride. However, the chloroaluminate system has several disadvantages which limits its use as an electrolyte for high energy density batteries: (1) the concentration of proton required for a stable lithium deposit is difficult to maintain for extended lengths of time and (2) the melt is not air stable and must be handled under inert conditions.

That is, if the cell is not properly sealed and leaks, the chloride in the melt will react with moisture in the air and form HCl, a corrosive gas.

Yet it would be desirable to utilize the advantages that low temperature molten salts offer (e.g., excellent electrochemical window, high conductivity and variable temperature range) but eliminate some of the previously mentioned problems for the chloroaluminate system.

By "low temperature" as used herein is meant temperatures below 100° C., including room temperature of about 20° C.

That is, it would be advantageous to use a lithium metal electrode in an MSE secondary or rechargeable cell for high voltage potential at, e.g. room temperature.

In the prior art relative to rechargeable cells having a molten salt electrolyte and a lithium electrode, one finds references such as U.S. Pat. No. 4,076,905 (1978) and U.S. Pat. No. 4,116,780 (1978) both to Sammells and U.S. Pat. No. 4,304,825 to Basu (1981). In each of these references, the lithium electrode is combined with another material, either as an alloy of silicon and boron or intercalated in graphite, with no suggestion of being able to employ a lithium metal electrode in a molten salt electrolyte for a rechargeable or secondary cell.

Accordingly there is a need and market for such a secondary cell that overcomes the above prior art shortcomings.

There has now been discovered such secondary cell wherein the lithium electrode can be charged and discharged repeatedly, while protecting the lithium electrode from reaction and erosion by the MSE, to gain advantage of the wide electrode chemical window attendant such cell system.

SUMMARY OF THE INVENTION

Broadly the present invention provides a method for preparing a stabilized rechargeable cell having a negative electrode and a molten salt electrolyte (MSE) which includes:

a) adding BF$_4^-$ anions to EMI$^+$ cations to obtain a melt of EMIBF$_4$ in the MSE, b) adding LiBF$_4$ to the melt, c) adding H$_2$O to the melt, d) applying a charging potential to the negative electrode to drive Li$^+$ ions from the melt to plate out as Li metal on the negative electrode and also to form a lithium salt film on the surface of the Li metal that protects such metal from reacting with the melt, which film is permeable to Li$^+$ ions and, e) continuing to apply the charging potential to drive Li$^+$ ions from the melt through the film, to plate out more Li metal on the negative electrode and build up same under the film.

The invention also provides a stabilized rechargeable cell which includes:

a) an MSE melt of LiBF$_4$/EMIBF$_4$, b) a lithium metal negative electrode and c) a lithium salt protective film deposited on the lithium metal surface of said electrode, which film is permeable to Li$^+$ ions.

BRIEF DESCRIPTION OF THE DRAWINGS

The invention will become more apparent from the following detailed specification and drawings in which.

DESCRIPTION OF PREFERRED EMBODIMENTS

Figure 1:
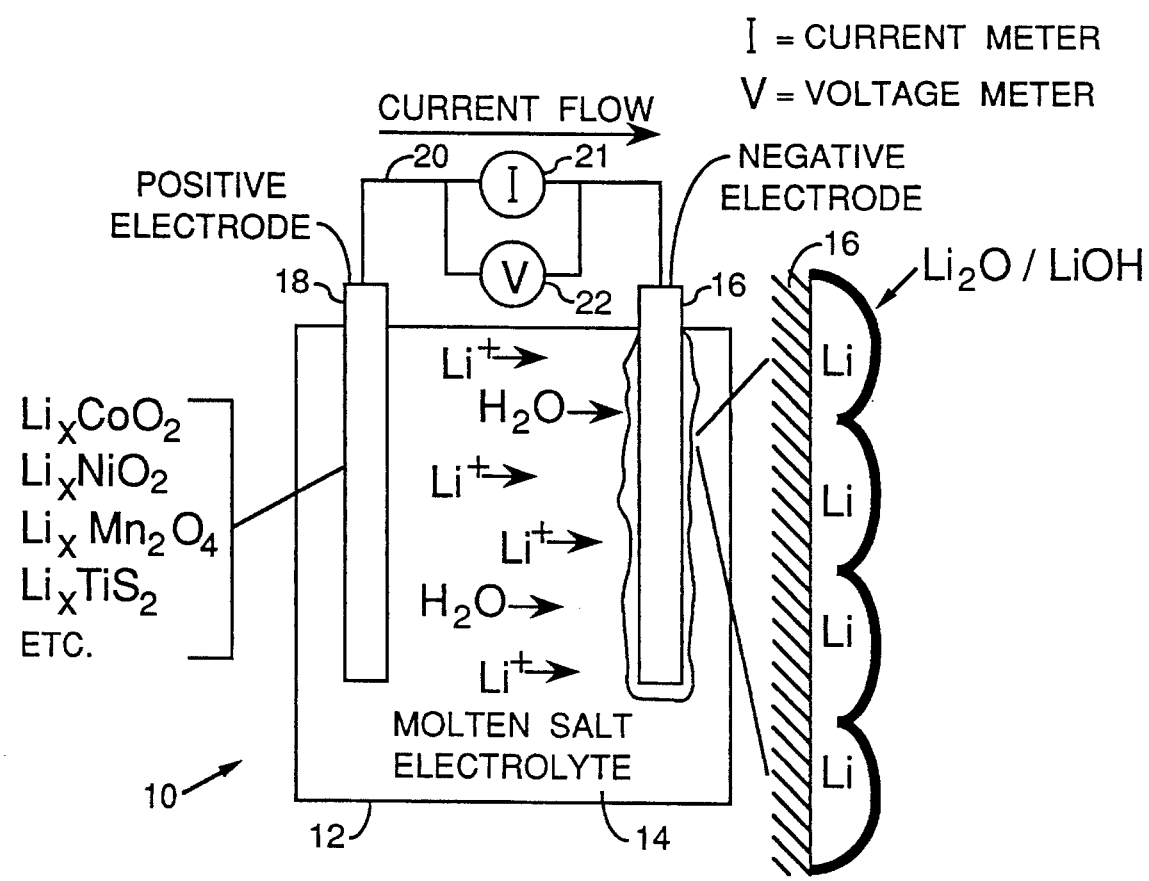
FIG. 1 is an elevated fragmentary schematic view of a secondary or rechargeable cell embodying the present invention and FIGS. 2, 3, 4 and 5 are fragmentary elevation schematic views of a portion of a negative electrode according to the present invention, during charging thereof.
Figure 2:
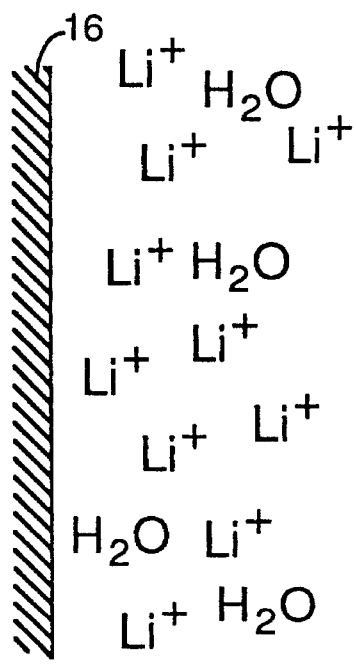

Referring in more detail to the drawings, secondary cell 10 has housing 12 containing MSE 14, negative electrode 16, positive electrode 18, conductor 20, ammeter 21 and voltmeter 22, as shown in FIG. 1.

Thus as indicated in FIG. 1, a negative electrode (which can be an inert substrate or collector electrode) 16 is inserted into a molten salt electrolyte (MSE) 14 containing Li$^+$ ions and an H$_2$O additive as solutes. The low-temperature molten salt electrolyte includes 1-ethyl-3-methylimidazolium (EMI$^+$) and BF$_4^-$ as anion and cation respectively. The anion and cation of the molten salt electrolyte are not shown in the Figures. Also dissolved in the MSE melt is LiBF$_4$ (in saturation) to provide a source for Li$^+$ ions to plate out on the negative electrode per FIGS. 1–5.

Figure 3:
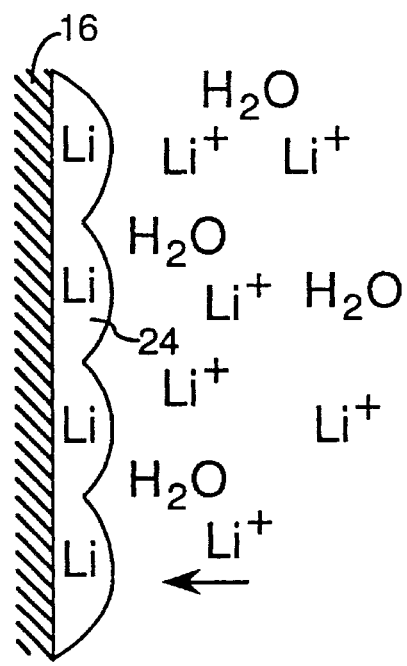

Thus as shown in FIG. 3, the Li$^+$ ion is electrochemically reduced to Li at the inert electrode 16 (Li$^+$+e$^-$>Li), producing a thin film of lithium metal 24. Then per FIG. 4, during the electrochemical reduction of Li, the H$_2$O solute reacts with the surface of the Li plated electrode 16 to form a stabilizing film thereon.

That is, where H$_2$O is added to an (EMI)(BF$_4$) molten salt electrolyte containing lithium ions, the stabilizing film is most likely lithium hydroxide or lithium oxide per the reactions:

$$Li + H_2O > LiOH + \tfrac{1}{2}H_2 \quad (1)$$

$$2\,Li + H_2O > Li_2O + H_2 \quad (2)$$

These reactions produce a thin film of insoluble $Li_2O$ and/or LiOH, at the surface of the Li metal that prevents reaction of such metal with the cation or anion (not shown) of the molten salt electrolyte. The thin film also prevents further reaction of Li metal with $H_2O$. Only a thin surface film is required to protect the Li metal deposit; thus only a low concentration of $H_2O$ (or other stabilizer additive) is required to produce the stabilizing film.

Figure 5:
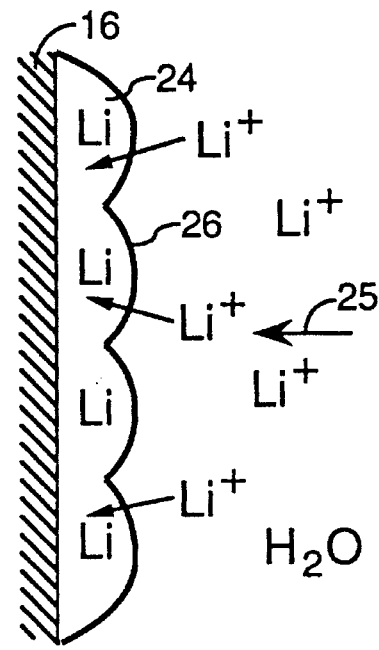

Then per FIG. 5, further reduction of $Li^+$ to Li, proceeds by transport of the $Li^+$ ion through the thin film 26 of $Li_2O$/LiOH. The stabilizing film is not permeable to the molten salt electrolyte ions nor to the $H_2O$ additive.

The above discussion in FIGS. 2–5 show a charging sequence of the negative electrode 16. On discharge, $Li^+$ ions are formed beneath the film 26 at FIG. 5 and flow in the opposite direction from arrow 25, which ions preferably flow through the stabilizing film 26 without breach thereof.

Figure 4:
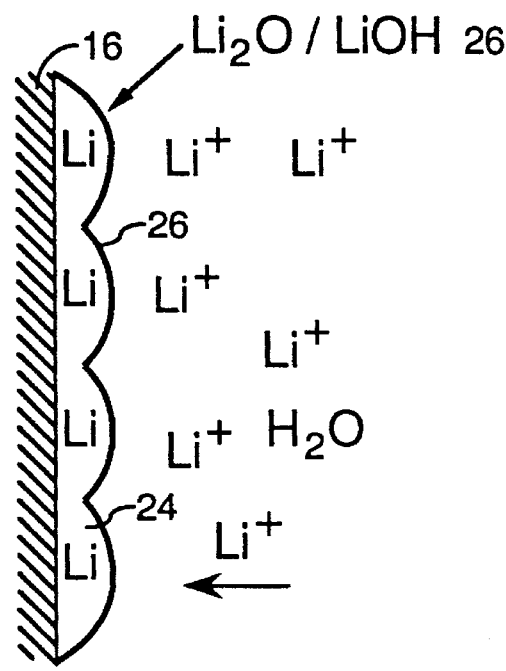

Thus the stabilized deposit of Li metal 24, shown in FIGS. 4 and 5, is available for anodization (discharge) and can function as the anode in a battery cell containing an appropriate cathode in a suitable MSE, as discussed below.

The Anodization of Li to $Li^+$ can follow two mechanisms:

1) Li is oxidized to $Li^+$ which is transported back through the stabilizing film 26, to the electrolyte solution, 14, eg. the reverse of FIG. 5. In this case the thin stabilizing film 26 remains intact and the rechargeable battery anode 16 functions by the forward and reverse directions of the process shown in FIG. 5. This is the preferred mechanism for Li anodization.

2) Li is oxidized to $Li^+$ which escapes to the molten salt electrolyte 14 by breakdown of the stabilizing film 26. This mechanism causes the underlying metallic Li deposit to come into direct contact with the molten salt electrolyte 14. In this case the thin stabilizing film must reform during charging and when metallic Li remains after a partial discharge. This is not the preferred mechanism for Li anodization but is included in the scope of the invention.

Thus in the secondary cell of the invention, a low-temperature MSE is employed which is desirably a melt of $EMIBF_4$ saturated with $LiBF_4$. To such MSE, is added a small amount of water as an electrode-stabilizing, film-forming additive as noted above.

As indicated in FIG. 1, various positive electrodes can be used in the secondary cell of the invention which electrodes include $Li_xCoO_2$, $Li_xNiO_2$, $Li_xMn_2O_4$, $Li_xTiS_2$, other transition metal chalcogenides, a $BF_4^-$ graphite intercalation cathode and electrochemically active conducting polymers.

The following example serves to illustrate the method and stabilized rechargeable MSE cell of the invention and should not be construed in limitation thereof.

EXAMPLE I

An $EMIBF_4$ melt was prepared by combining equimolar quantities of EMIC and $AgBF_4$ in water. The solution was stirred for two hours and the resulting AgCl was filtered and set aside for recycling. The clear solution was rotoevaporated down to a clear oil. The resulting $EMIBF_4$ was placed in a vacuum oven at 80° C. for 24–48 hrs. A final molten salt product of about 20 g of $EMIBF_4$ melt resulted.

About 0.36 g of $LiBF_4$ was added to the 20 g (about 15 mL) $EMIBF_4$ melt, giving a saturated solution containing ca 0.1M $Li^+$. Cyclic voltammetry at an inert Pt electrode (area=0.02 $cm^2$) showed no deposition or stripping of metallic lithium; only the irreversible reduction of the $EMI^+$ organic cation was seen at −2.2 V versus an Al/Al(III) reference electrode.

Then a small amount of water was added. That is, after addition of 10 μl $H_2O$ (40 mM), the $EMI^+$ reduction was suppressed and the reversible deposition-stripping of metallic lithium was observed at −3.0 V with a cycling efficiency of 56%.

Thus, adding a few microliters of water provided a protective lithium salt film over the lithium metallic electrode and resulted in the appearance of lithium deposition and stripping waves at −3V. Cycling efficiencies were indicated at greater than 60% for the above negative electrode having a Pt substrate. A similar cycling efficiency was found when the negative electrode had a tungsten substrate.

The $LiBF_4$/$EMIBF_4$ molten salt system of the invention is a promising electrolyte for high voltage rechargeable lithium batteries. Because the anodic limit is greater than +2 V for this electrolyte, a 5 V battery is possible if the lithium couple at −3 V is combined with appropriate cathodic material.

Accordingly the above low temperature MSE or melt of the invention has many of the salient features of the prior art chloroaluminate system, i.e. a wide electrochemical window (>4 V), a variable temperature range and high inherent conductivity. In addition however, it is air stable (without the HCl-forming problems of the above prior art system) and $LiBF_4$ has considerable solubility in the melt of the invention.

For further information on the $LiBF_4$/$EMIBF_4$ melt in the secondary cell of the present invention, attention is directed to a Paper published by J. Fuller et al, designated Abstract No. 15, published in Extended Abstracts, Vol. 95-1, by the Electrochemical Society (1995) entitled "Lithium Anode Studies in a Tetrafluoroborate Molten Salt Electrolyte", which Paper is incorporated herein by reference.

Accordingly the secondary cell of the present invention employs a low temperature MSE that has a wide electrochemical window that can lead to 5 V rechargeable, high energy batteries.

What is claimed is:

1. A method for preparing and operating a stabilized rechargeable cell having a negative electrode and a molten salt electrolyte (MSE) comprising:
   a) adding $BF_4^-$ anions to $EMI^+$ cations to obtain a melt of $EMIBF_4$ in said MSE,
   b) adding $LiBF_4$ to said melt,
   c) adding $H_2O$ to said melt,
   d) applying a charging potential to said negative electrode to drive $Li^+$ ions from said melt to plate out as Li metal on said negative electrode and
   also to form a lithium salt film on the Li metal surface that protects such metal from reacting with said melt, which film is permeable to $Li^+$ ions and
   e) continuing to apply said charging potential to drive $Li^+$ ions from said melt through said film, to plate out more Li metal on said negative electrode and build up as more metal under said film.

2. The method of claim 1 wherein said negative electrode is discharged to reverse said $Li^+$ ion flow from said negative electrode through said film and into said MSE.

3. The method of claim 1 wherein said MSE is prepared by adding equimolar quantities of EMIC and $AgBF_4$ and forming AgCl precipitate and filtering same out, to arrive at $EMIBF_4$ in said MSE and then saturating same with $LiBF_4$.

4. The method of claim 1 wherein 10 to 100 m/m $H_2O$ is added to said melt.

5. The method of claim 1 wherein said film that forms on said Li metal is selected from the group consisting of $Li_2O$, LiOH and a combination thereof.

6. The method of claim 1 wherein said melt is charged and recharged at $-40°$ to $+100°$ C. including at room temperature.

* * * * *